Jan. 25, 1944.     R. G. LARSEN ET AL     2,339,786
REFINING OF LUBRICATING OILS
Filed Nov. 30, 1942     2 Sheets-Sheet 2
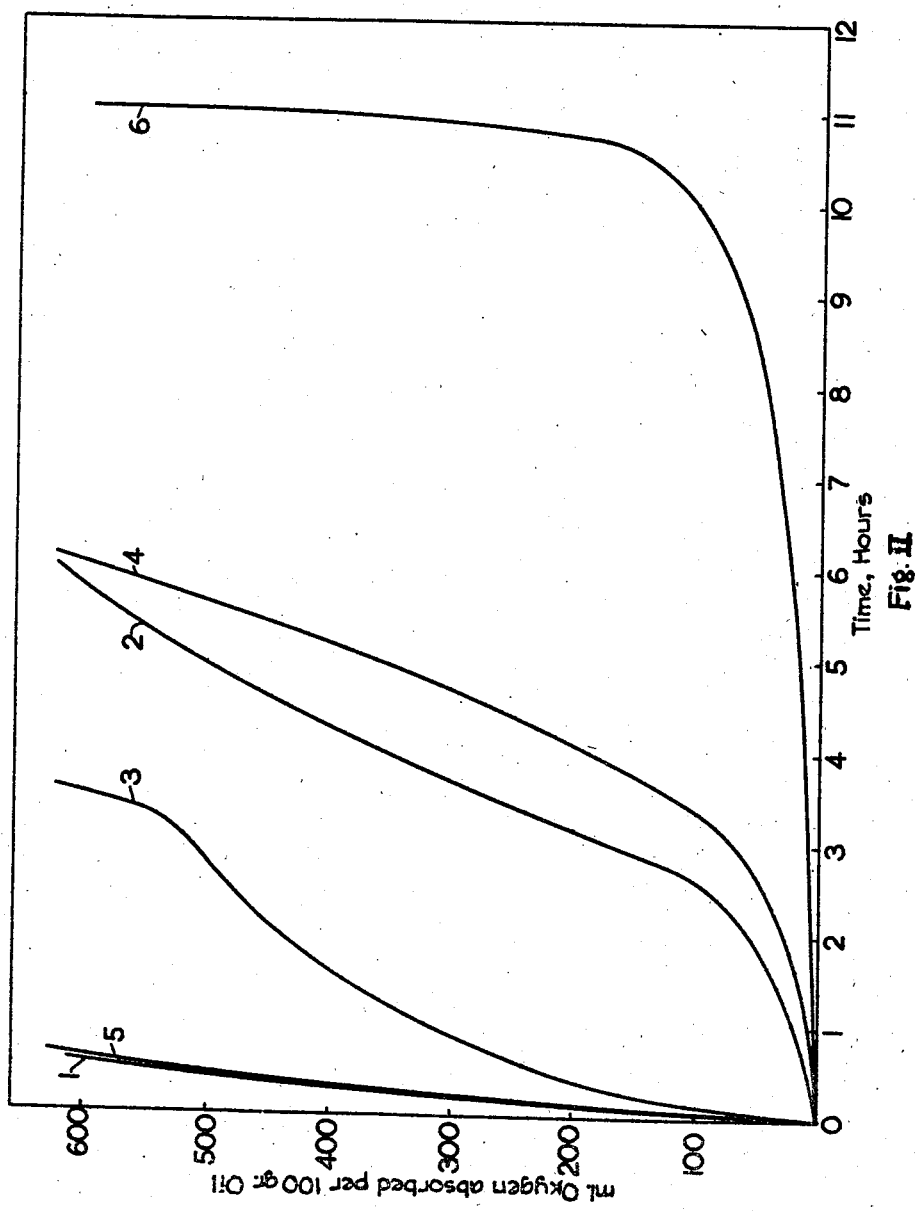
Fig. II
Inventors: Robert G. Larsen
Forrest J. Watson
By their Attorney:

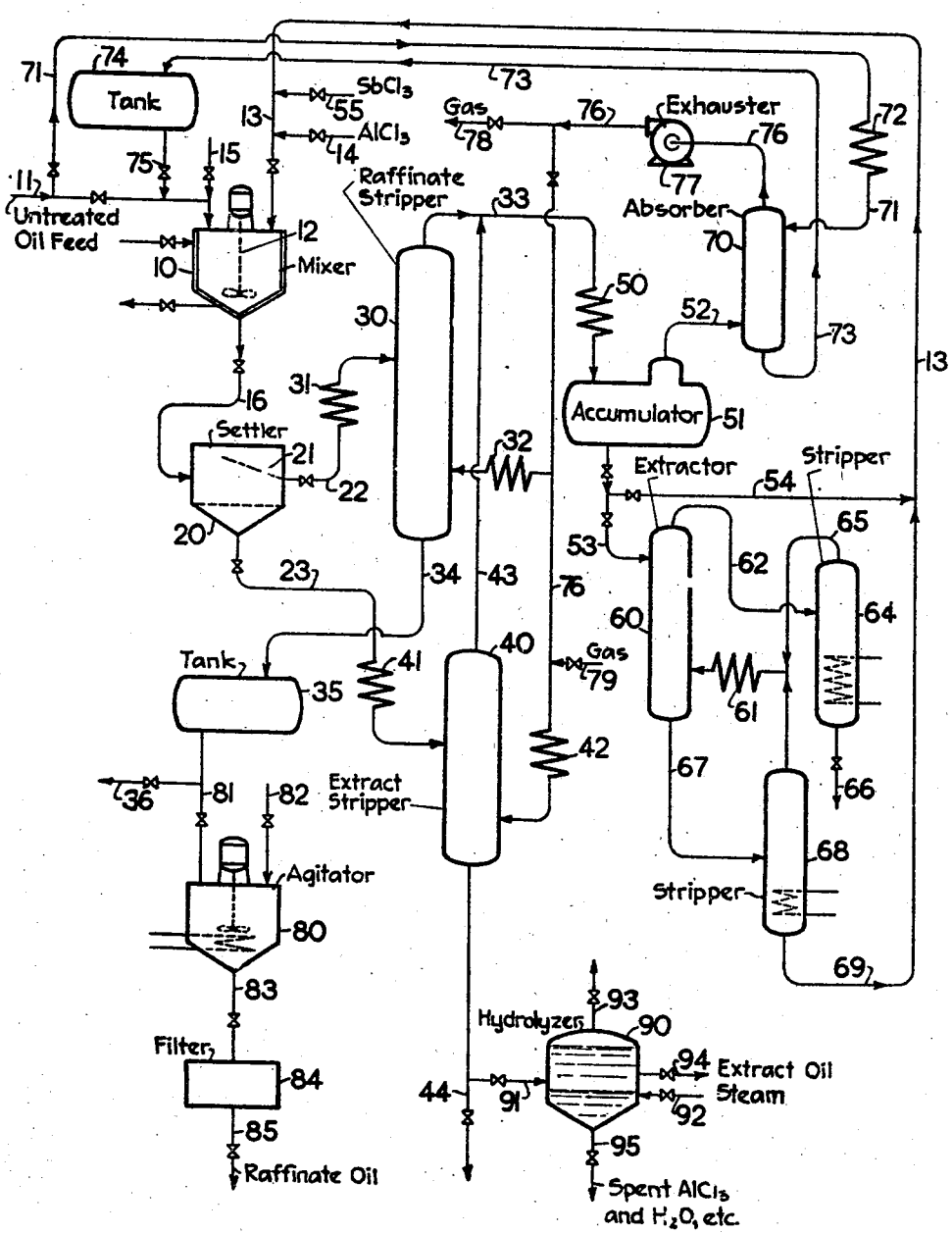
Fig. I
Inventors: Robert G. Larsen
Forrest J. Watson
By their Attorney:

Patented Jan. 25, 1944

2,339,786

UNITED STATES PATENT OFFICE 2,339,786

REFINING OF LUBRICATING OILS

Robert G. Larsen, Albany, and Forrest J. Watson, Oakland, Calif., assignors to Shell Development Company, San Francisco, Calif., a corporation of Delaware Application November 30, 1942, Serial No. 467,462

16 Claims. (Cl. 196—13)

This invention relates to a process for refining hydrocarbon oils in which the refining agent comprises a slurry of aluminum chloride powder dispersed in liquid antimony trichloride. More particularly, it deals with a finishing treatment in the refining of mineral lubricating oils to reduce their sulfur content, thereby increasing the oxidation inhibitor susceptibility of said oils as measured by the induction period.

Previously, aluminum trichloride treatment of lubricating oils has been carried out by agitating the oil with a small amount of aluminum chloride at elevated temperature of incipient cracking, but probably below temperatures at which cracking predominates. During this treatment the aluminum chloride forms complexes with the undesirable impurities in the lubricating oils, some of which complexes form a sticky sludge which can be removed by settling, while other complexes are oil-soluble and must be removed by washing and/or clay treatment. The aluminum chloride complex precipitates generally are not very dense compounds as compared to the density of the oil, and therefore are usually very slow to settle and hard to separate from the oil. Also, since aluminum chloride is such a strong reactive chemical some undesirable cracking of the oils treated usually occurs.

Liquid antimony trichloride treatment of hydrocarbon oils is a selective solvent treatment and extracts the impurities from the oils. The liquid antimony trichloride has the advantage over aluminum chloride for treating lubricating oils in that the former is much denser and settles from the oils much more readily. Since antimony trichloride melts at 73° C. it can be readily used as a liquid and thus insures much more intimate contact with the impurities in the oil treated than would dispersed aluminum chloride particles. Although antimony trichloride is much less chemically active than aluminum chloride, it is very corrosive and hydrolyzes readily in the presence of water. Because it is less active than aluminum chloride, much larger quantities of it—usually several times the volume of the oil treated—are required to obtain the same degree of refinement as with aluminum chloride.

The process of this invention combines the advantages of both antimony trichloride-solvent extraction and aluminum chloride-chemical treatment, producing a final product more highly refined than either treatment separately could produce, as well as minimizing the disadvantages of each treatment. The advantages of such a combined treatment include: increasing the selectivity for aromatics and sulfur in the hydrocarbon oils; increasing the chemical activity of aluminum chloride; increasing the dispersion of aluminum chloride through the oil; increasing the removal and speeding the separation of the aluminum chloride sludge from the oil; reducing the amount of antimony trichloride necessary for the treatment over use of antimony trichloride alone and thereby also reducing the amount of antimony trichloride to be recovered; and reducing the high temperatures required to obtain active treatment as compared with that of aluminum chloride alone and thereby minimizing cracking.

Some of the purposes of the process of this invention are to remove economically and quickly aromatics, unsaturates, oxygen, sulfur, nitrogen organic compounds, etc., from hydrocarbon oils; to improve oxidation inhibitor susceptibility in hydrocarbon oils as measured by the induction period; to improve the color of hydrocarbon oils; to eliminate constituents which are responsible for the formation of insoluble sludge on oxidation of the hydrocarbon oils; to reduce the sludging tendency of hydrocarbon lubricating oils; to remove mercaptans from gasoline and lighter hydrocarbon oils; to facilitate the sludge separation from hydrocarbon oils treated; to reduce decomposition of hydrocarbons contacted with aluminum chloride; and many others, which will appear from time to time in the description which follows. In summary, a primary purpose of this invention is to combine the advantages of antimony trichloride-solvent extraction and aluminum chloride chemical treatment of lubricating oils, without combining their disadvantages, and to produce advantages which are more than cumulative of either treatment, taken separately.

The types of oils which may be treated by the process of this invention include hydrocarbon oils and mineral oils such as: various mineral oils which may contain minor amounts of asphalts and resins, various distillates such as gasolines, kerosene, Diesel fuels and lubricating oils; raffinates from solvent extraction of oils rich in paraffinic hydrocarbons; oils having received various pretreatments such as sulfuric acid treatment; fatty oils; fatty acids; etc. However, hydrocarbon oils of the lubricating oil range which are highly paraffinic, e. g., solvent extracted oils, are most responsive to the treatment of this invention, and more particularly antimony trichloride extracted oils in which the process of this invention is a finishing treatment.

Preferably the process of this invention may be divided into nine major steps, seven of which are essential to the efficient operation of the process, and the last two of which are additional preferred steps to produce a purer finished product. These steps are:

(1) The contact step, which comprises contacting the hydrocarbon oil to be treated with a slurry of aluminum chloride dispersed in liquid antimony trichloride, which slurry reacts with and extracts the impurities present in the hydrocarbon oil to produce a mixture of slurry and oil.

(2 The separation step, which comprises the separation of said slurry and oil mixture into a raffinate or upper phase containing a small portion of the antimony trichloride, and an extract or lower phase comprising unused aluminum chloride and its sludge including complexes, extracted oils, and the remaining major portion of the antimony trichloride.

(3) The raffinate recovery step, which comprises removal of the antimony trichloride from the raffinate phase by blowing it with a heated inert carrier gas at a reduced pressure to vaporize the antimony trichloride from the raffinate oil and produce a liquid raffinate oil free of antimony trichloride, and a vapor consisting of the antimony trichloride, said inert carrier gas and a small amount of hydrocarbons, which latter accumulate in the antimony trichloride due to unavoidable cracking of the oil being treated in this and the previous steps.

(4) The extract recovery step, which comprises the removal of antimony trichloride from the extract phase by the same method as used in step 3 to produce an extract free from antimony trichloride, and a vapor containing the antimony trichloride, inert carrier gas, and a small amount of accumulated hydrocarbons.

(5) The antimony trichloride separation step, which comprises the separation of the antimony trichloride from the vapors produced in steps 3 and 4 by condensation of at least a portion of the accumulated liquefiable hydrocarbons and the antimony trichloride from said vapors.

(6) The antimony trichloride purification step, which comprises the removal of the accumulated liquid hydrocarbons in that portion of the vapors condensed in step 5.

(7) The antimony trichloride recovery step, which comprises the removal of the antimony trichloride from the remaining uncondensed portion of the vapors from step 5 by reabsorption of the antimony trichloride therein in the oil feed entering step 1.

(8) The raffinate purification step, which comprises clay treatment of the raffinate free of antimony trichloride produced in step 3.

(9) The extract purification step, which comprises stripping the aluminum chloride from the extract which has been freed from antimony trichloride in step 4 by steam-stripping and hydrolyzing the aluminum chloride and its complexes to produce two layers, an oily extract or upper layer; and an aqueous or lower layer; and separating said layers.

Figure I of the accompanying drawings shows a flow diagram of a preferred embodiment of this invention.

Figure II is a graph comparing the inhibitor susceptibility of an oil treated by this process with that of other treated oils.

The following description is a detailed explanation of the diagram disclosed in Figure I of the drawings which, for purposes of illustration, has been adapted as a finishing treatment for a solvent-treated lubricating oil.

(1) *Contact step.*—Referring to the drawings, oil to be treated is introduced into the closed and steam jacketed mixing kettle 10 through valved oil feed line 11. The mixer 10 is agitated by stirrer 12. Liquid antimony trichloride slurry containing suspended aluminum chloride powder enters the kettle 10 through valved line 13. Dry powdered aluminum chloride is fed by a screw conveyor or other suitable means (not shown) through valved line 14 into the liquid antimony trichloride stream in line 13 to produce said slurry.

The amount of liquid antimony trichloride added to make up the slurry may vary from about 5 to 200% by weight of the oil treated, and the aluminum chloride powder added may vary from about 5 to 15% by weight of said oil; preferably about 10% by weight of each antimony trichloride and aluminum chloride are used. Accordingly, the percentage of slurry to the oil to be treated may vary from about 10 to 215% by weight.

Inert diluents such as pentanes, hexanes, octanes, alcohols, ethers, naphthas, and gasolines may be employed with the oil and be introduced through valved line 15 to decrease the viscosity of the oil and thereby decrease the settling time of the sludge formed during the treatment. If diluents are used they must be subsequently removed from the oil by an additional step not disclosed in this process, such as by fractionally distilling the raffinate oil. Suitable quantities of diluents may vary anywhere from a fraction to several volumes of the oil.

The mixer 10 is heated to above about 73° C., the melting point of pure antimony trichloride, and preferably to between about 70° and 150° C. It is very important to keep both oxygen and water out of the system at all times in this step as well as the steps to follow, except step 9; and accordingly an atmospheric pressure blanket of an inert gas such as methane, ethane, natural gas, hydrogen, nitrogen, etc., is employed whenever possible.

The mixing is continued from 10 minutes to about 2 hours, depending upon the oil treated, the temperature employed, the amount of aluminum chloride and antimony trichloride employed, and the degree of treatment desired. Usually, however, the treatment is for about a period of one hour. After the treatment has been completed the oil slurry mixture is withdrawn from kettle 10 through valved line 16 and another batch is prepared in the kettle.

(2) *The separation step.*—From kettle 10 in step 1 above, the mixture of oil and slurry passes through line 18 to settler 20, which is of sufficient capacity to act not only as a liquid phase separator but also as a surge tank so that the remaining steps of the process may be carried out continuously. In settler 20 the mixture separates into an upper or raffinate oil phase and a lower or extract-sludge phase. Both phases contain liquid antimony trichloride, the major portion of antimony trichloride, however, being in the extract phase. The extract phase also contains aluminum chloride sludge and its oil complexes, as well as aromatics and unsaturates and some naphthenic oils extracted from the hydrocarbon oil feed by the antimony trichloride. The raffinate oil layer is continuously withdrawn from settler 20 through swing pipe 21 and valved line 22 in the side of settler 20, and the extract sludge phase is withdrawn through valved line 23 at the bottom of settler 20.

The temperature of the mixture is maintained at all times above about 73° C. (the melting point of antimony trichloride) so that both phases will remain substantially in the liquid state.

A centrifuge or other mechanical apparatus may be employed in this step to aid the separation of the two phases.

Also, a countercurrent liquid extractor column may be used to combine steps 1 and 2 above described, if desired, and the oils treated permit the use of such apparatus.

(3) *The raffinate recovery step.*—From settler 20 the raffinate phase is passed through valved line 22 and through a heater 31 into raffinate stripper 30 wherein the antimony trichloride is stripped with a dry inert carrier gas under a reduced pressure and a temperature ranging from about 110 to not more than about 150° C., depending upon the composition of the raffinate and the amount of heat needed to drive off all the antimony trichloride therein without causing any change in the composition of the oil or decomposition of the antimony trichloride. The carrier gas is preheated in heater 32 and enters the stripper 30 near its bottom. Side heaters (not shown) may be employed to maintain the temperature in stripper 30 within the proper limits of 110 to 150° C. The reduced pressure in stripper 30 and other pieces of apparatus in the process through step 7 is provided by an exhauster 77, which will be described later and maintains a subatmospheric pressure in this and the intervening steps of between about 20 and 100 mm. of mercury.

The vapors of inert gas and antimony trichloride, together with a small amount of accumulated hydrocarbons, pass from the top of stripper 30 through line 33 and raffinate free from antimony trichloride is withdrawn from the bottom of stripper 30 through line 34 into surge tank 35. From tank 35 the raffinate oil may be withdrawn as a final product through valved line 36, or it may be further purified as described in step 8.

(4) *Extract recovery step.*—From settler 20 the extract-sludge phase is passed through valved line 23 and heater 41 into extract stripper 40 maintained at a reduced pressure similar to stripper 30, but usually maintained at a temperature about 25° C. below that of stripper 30 because of the aromatics and impurities present in the extract phase, which more readily react at the higher temperatures with the antimony trichloride and aluminum chloride present. Inert carrier gas is preheated in heater 42 and is introduced near the bottom of stripper 40. Because of the larger amount of antimony trichloride present in the extract sludge and the lower temperature employed in stripper 40, it is necessary usually to introduce a larger volume of inert gas in stripper 40 than in stripper 30. Side heaters (not shown) may also be employed on stripper 40 to maintain the temperature not over about 125° C. and not below about 110° C.

The vapors of inert gas and antimony trichloride, together with a small amount of accumulated hydrocarbons, pass out the top of stripper 40 through line 43 and join line 33 of the vapors from stripper 30; and the extract sludge now containing unused aluminum chloride and its complexes, but free of antimony trichloride, is withdrawn from the bottom of stripper 40 through valved line 44 and may be discarded or the extract may be purified as described later in step 9.

(5) *Antimony trichloride separation step.*— The vapors of antimony trichloride and gas in lines 33 and 43 (from strippers 30 and 40 respectively) are joined and enter condenser 50, wherein they are cooled to a temperature just above the melting point of antimony trichloride at the maintained reduced pressure. These vapors are then passed into accumulator 51, wherein the condensed antimony trichloride and accumulated liquid hydrocarbons are removed. If the amount of liquid hydrocarbons accumulated in the antimony trichloride is not so great as to cause objectionable dilution of the antimony trichloride, the purification step may be partly or wholly bypassed through valved line 54 to join line 13 and the antimony trichloride may be returned to kettle 10 wherein fresh aluminum chloride is admitted from line 14 as described above. If make-up antimony trichloride must be added it may be introduced into valved line 13 through valved line 55.

(6) *The antimony trichloride purification step.*—Usually it is necessary to purify at least a portion if not all of the condensed vapors from accumulator 51 each cycle. Accordingly, they are passed through valved line 53 into extractor 60 wherein the liquid hydrocarbons, which have accumulated in the antimony trichloride due to unavoidable cracking of the oils treated in the previous steps of this process, are extracted by a suitable stable low boiling liquid hydrocarbon solvent which enters the bottom of extractor 60 from condenser 61. The hydrocarbon solvent must be inert to antimony trichloride at the temperatures involved, boil below the boiling temperature of the liquid accumulated hydrocarbons and antimony trichloride, and be more miscible with the liquid hydrocarbons therein than antimony trichloride. Such a solvent may be paraffinic hydrocarbons such as butanes, pentanes, hexanes, etc., n-butane and n-pentane being preferred.

The liquid hydrocarbons, which are miscible in the solvent, form a separate upper phase which is withdrawn from the top of extractor 60 through line 62 to stripper 64 wherein the hydrocarbon solvent is vaporized from the extracted liquid hydrocarbons and returned from the top of stripper 64 through line 65 to condenser 61 and extractor 60, and the remaining liquid hydrocarbons are withdrawn from the bottom of stripper 64 through valved line 66 and may be discarded, burned or used as a blending stock for stove oils or other fuels, as desired.

The antimony trichloride substantially free from the liquid hydrocarbons is withdrawn from the bottom of extractor 60 together with some hydrocarbon solvent through line 67 to another stripper 68 wherein the hydrocarbon solvent, which is selected to be more volatile than the antimony trichloride, is distilled from the antimony trichloride to join the hydrocarbon solvent in line 65. The purified antimony trichloride substantially free from all hydrocarbons is withdrawn from the bottom of stripper 68 through line 69, which joins line 13 returning the antimony trichloride to kettle 10 as described above. The strippers 64 and 68 are provided with reboilers at their bottoms to vaporize the hydrocarbon solvent from the liquids therein and may also be provided with reflux at their tops (not shown) to obtain better fractionation.

(7) *The antimony trichloride recovery step.*— The uncondensed vapors in accumulator 51 which are passed from the top of accumulator 51 through line 52 enter the absorber 70, wherein they are contacted with at least a portion of the untreated oil from the feed line 11, introduced near the top of absorber 70 through valved line 71. This line 71 may be provided, if desired, with a heater 72 to decrease the viscosity of the oil and increase its efficiency and utility in absorbing and removing the remaining portion of the antimony trichloride in the vapors.

The oil feed containing small amounts of antimony trichloride and possibly some non-liqueflable accumulated hydrocarbons is withdrawn from the bottom of the absorber 70 through line 73 into the surge tank 74 from which it is withdrawn through valved line 75 into feed line 11 and mixer 10 as desired. Inasmuch as this feed already contains some antimony trichloride, the amount of antimony trichloride admitted to this mixer through line 13 would be the difference between the amount required in the treatment and that contained in the feed oil.

The residual gas free from antimony trichloride now consisting of the remaining accumulated hydrocarbons and the inert carrier gas, obtained in absorber 70, returns through valved line 76 containing exhauster 77 to strippers 30 and 40. Excess gas from exhauster 77, if any, or gas that is fouled, may be withdrawn through valved line 78 and discarded or used as a fuel. Make-up gas may be introduced into the system through valved line 79.

The exhauster 77 maintains a subatmospheric pressure of between about 20 and 100 mm. of mercury on the absorber 70, accumulator 51, condenser 50, strippers 30 and 40, and the lines connecting them as previously mentioned. The advantage of placing one large exhauster here rather than one small exhauster on each of the above mentioned units avoids corrosion which would take place in several of the smaller exhausters from antimony trichloride vapors produced in these units, whereas the gas at the top of absorber 70 is free from antimony trichloride.

The carrier gas employed in the described process must be inert toward both antimony trichloride and the oil feed at the temperatures employed, and must also be free of water vapor and oxygen. Some gases which may be used include: the saturated hydrocarbon gases boiling below 10° C., such as methane, ethane, propanes, butanes; natural gas; dimethyl ether; nitrogen; or the like.

(8) *Raffinate purification step.*—The raffinate collected in surge tank 35 may be further treated and purified, if desired, by introducing a batch of it into a heated agitator or clay treater 80 through valved line 81 and mixing with it some adsorbent or lubricating oil treating clay, such as Florida clay, Attapulgas clay, acid-activated clay, bentonite, or the like, from valved line 82. After completed contact in agitator 80 to remove remaining traces of impurities, the clay oil mixture is withdrawn from the bottom of kettle 80 through valved line 83 and passed through filter 84 to remove the clay. The resulting refined oil is withdrawn from the filter 84 through line 85 as the final purified product.

Instead of "contact" treatment with fine clay, percolation through a filter bed may be used. Sometimes clay treatment may be dispensed with, in which case the finished oil is withdrawn from tank 35 through valved line 36 as mentioned above.

(9) *The extract recovery step.*—If the extract sludge containing mostly aluminum chloride and its oil complexes from the extract stripper 40 is not discarded through valved line 44 it may be passed into the hydrolyzer 90, through valved line 91, and therein contacted with live steam (some of which is allowed to condense) entering near the bottom of the hydrolyzer through valved line 92. This steam agitates the sludge, strips out cracked lighter hydrocarbons and impurities, separates the extracted oils, and hydrolyzes the aluminum chloride, thereby producing respectively a vapor which is withdrawn through vent line 93 in the top of hydrolyzer 90, an upper oily layer of extract which is withdrawn through the side valved line 94, and a lower layer comprising water-soluble products of hydrolysis, tars, etc., which latter layer is withdrawn and discarded through valved line 95 at the bottom of hydrolyzer 90. The hydrolyzer may be provided with a water condenser (not shown) near its top to condense steam necessary for the formation of the aqueous layer.

The extract oil comprises aromatics, naphthenes, and/or sulfur, oxygen and/or nitrogen organic compounds, which are detrimental and undesirable in the oil treated. The vapors from the vent line 93 may be discarded or used as a fuel.

Incidental parts of the apparatus, such as additional heaters, valves, tanks, pumps and the like, are not shown, and their placement is within the common knowledge of those skilled in the art.

The process may be run continuously, intermittently and/or batchwise, as desired.

The following comparative examples show the advantage of the combination $SbCl_3$-$AlCl_3$ refining over treatments employing approximately equal amounts of either $SbCl_3$ or $AlCl_3$ alone at 80° C. on the same oil, namely a Mt. Poso, California, lubricating oil extracted with furfural to 50 V. I. Each of these examples was treated under the same conditions including a finishing clay treatment.

| Treating agent used | Percent weight treating agent | On finished oil | |
| --- | --- | --- | --- |
| | | Percent sulfur | Specific dispersion |
| $AlCl_3$ | 20.4 | 0.16 | 103.2 |
| $SbCl_3$ | 21.4 | 0.29 | 105.1 |
| $AlCl_3$ } slurry | 10.1 | 0.04 | 101.0 |
| $SbCl_3$ | 9.9 | | |

The inhibitor susceptibilities of the above oils were then determined by adding .1% phenyl alpha naphthylamine to a portion of each and subjecting inhibited as well as uninhibited samples to an oxygen absorption test in the presence of metallic copper. Results of these tests are shown in Figure II of the drawings, wherein the amount of oxygen absorbed is plotted against time. Six curves are shown corresponding to the following samples and having approximately the following induction periods.

| Curves | Treatment of sample | Percent by wt. of inhibitor | Approximate induction period in hours | Percent isopentane insolubles |
| --- | --- | --- | --- | --- |
| 1 | 20.4% $AlCl_3$ | 0 | 0 | .74 |
| 2 | do | .1 | 2 | 1.47 |
| 3 | 21.4% $SbCl_3$ | 0 | 0 | 1.18 |
| 4 | do | .1 | 3 | 1.52 |
| 5 | 9.7% $AlCl_3$+9.7% $SbCl_3$ | 0 | 0 | .06 |
| 6 | 9.7% $AlCl_3$+9.7% $SbCl_3$ | .1 | 10½ | .14 |

The last column of this table shows another advantage of the combination $SbCl_3$-$AlCl_3$ treatment of this invention, viz., the lower percent of isopentane insolubles present in the finished oil after the oxidation test which is a measure of the sludging tendency of the oil.

We claim as our invention:

1. A process for treating a hydrocarbon oil comprising contacting said oil with between about 10% and 215% by weight on the oil of a slurry of aluminum chloride and antimony trichloride, which slurry consists essentially of between about 5% and 15% by weight aluminum chloride and between about 5% and 200% by weight of antimony trichloride, to produce two phases, and separating said phases.

2. The process of claim 1 wherein the hydrocarbon oil is a mineral lubricating oil rich in paraffinic hydrocarbons.

3. The process of claim 1 wherein the amount of aluminum chloride and antimony trichloride is about 10% of each by weight.

4. A process for treating a hydrocarbon oil comprising contacting said oil with a slurry of aluminum chloride dispersed in liquid antimony trichloride to produce two phases, each of which contains antimony trichloride, separating said phases, and separately removing the antimony trichloride from each phase.

5. A process for refining a hydrocarbon oil comprising contacting said oil with a slurry of aluminum chloride dispersed in liquid antimony trichloride to produce a raffinate phase and an extract sludge phase, each of which contains antimony trichloride; separating said phases and separately vaporizing the antimony trichloride from the raffinate phase and from the extract sludge phase to produce a raffinate oil, an aluminum chloride sludge containing extract oil, and vapors of antimony trichloride; condensing at least a portion of the antimony trichloride vapors; and recycling said condensed antimony trichloride for further contact with more hydrocarbon oil.

6. A continuous process for treating hydrocarbon oil comprising contacting said oil with a slurry of aluminum chloride dispersed in liquid antimony trichloride to produce a raffinate phase and an extract sludge phase, each of which contains antimony trichloride; separating said phases; separately vaporizing the antimony trichloride from the raffinate phase and from the extract sludge phase with an inert carrier gas to produce a raffinate oil, an aluminum chloride sludge containing extract oil, and vapors containing antimony dichloride; separating the antimony trichloride from said vapors; and recycling said separated antimony trichloride from further contact with more hydrocarbon oil.

7. The process of claim 6 wherein the inert carrier gas is natural gas.

8. A continuous process for refining hydrocarbon oil comprising contacting said oil with a slurry of aluminum chloride dispersed in antimony trichloride to produce a raffinate phase and an extract sludge phase, each of which contains antimony trichloride; separating said phases; separately vaporizing the antimony trichloride from the raffinate phase and from the extract sludge phase with an inert carrier gas to produce a raffinate oil, an aluminum chloride sludge containing extract oil, and vapors containing antimony trichloride, liquefiable hydrocarbons produced from cracking of the oil treated and said inert carrier gas; condensing at least a portion of the antimony trichloride and liquefiable hydrocarbons from said vapors; separating at least a portion of the liquid hydrocarbons from said condensed antimony trichloride to produce liquid antimony trichloride substantially free of said liquid hydrocarbons; and mixing said separated antimony trichloride with fresh aluminum chloride for further contact with more hydrocarbon oil.

9. A continuous process for refining hydrocarbon oil comprising the steps of: contacting said oil with a slurry of aluminum chloride dispersed in liquid antimony trichloride at a temperature above about 73° C., which slurry consists essentially of equal portions of aluminum chloride and antimony trichloride to produce a raffinate phase and an extract sludge phase, each of which contains antimony trichloride; separating said phases; separately vaporizing the antimony trichloride from the raffinate phase at a temperature between about 110° C. and 150° C. and from the extract sludge phase at a temperature not over about 125° C., each at a reduced pressure, with an inert carrier gas to produce a raffinate oil, an aluminum chloride sludge containing extract oil, and vapors containing antimony trichloride, liquefiable hydrocarbons produced from cracking of oil treated in previous steps and said inert carrier gas; condensing at least a portion of said antimony trichloride and liquefiable hydrocarbons from said vapors; purifying at least a portion of said condensed antimony trichloride by removing the liquid hydrocarbons therefrom with normal pentane to produce liquid antimony trichloride substantially free of inert carrier gas and liquid hydrocarbons; and recycling said purified antimony trichloride for further contact with more hydrocarbon oil.

10. The process of claim 9 wherein said slurry is contacted with said hydrocarbon oil at a temperature between about 70° C. and 150° C.

11. The process of claim 9 wherein the antimony trichloride is vaporized from said phases at a subatmospheric pressure between about 20 and 100 mm. of mercury.

12. The process of claim 9 plus the additional step of clay-treating said raffinate oil.

13. The process of claim 9 plus the additional steps of hydrolyzing said aluminum chloride sludge containing extract oil to produce an extract oil layer, and an aluminum chloride layer, and separating said layers.

14. A continuous finishing process for refining mineral lubricating oil rich in paraffinic hydrocarbons comprising the steps of: extracting said oil with antimony trichloride; contacting said oil with a slurry of equal portions of aluminum chloride and antimony trichloride at a temperature above about 73° C. to produce a raffinate phase and an extract sludge phase, each of which contains antimony trichloride; separating said phases; separately vaporizing the antimony trichloride from the raffinate phase and from the extract sludge phase at a subatmospheric pressure with an inert carrier gas to produce a raffinate oil, an aluminum chloride sludge containing extract oil, and vapors containing antimony trichloride and said inert carrier gas; separating the antimony trichloride from said vapors; and mixing said separated antimony trichloride with fresh aluminum chloride for further contact with more hydrocarbon oil.

15. A continuous process for refining hydrocarbon oil comprising the steps of: contacting said oil with a slurry of aluminum chloride dispersed in liquid antimony trichloride to produce a raffinate phase and an extract sludge phase, each of which contains antimony trichloride; separating said phases; separately vaporizing the antimony trichloride from the raffinate phase and from the extract sludge phase with an inert carrier gas to produce a raffinate oil, an aluminum chloride sludge containing extract oil, and vapors containing antimony trichloride, liquefiable hydrocarbons produced from cracking of oil treated in previous steps and said inert carrier gas; condensing at least a portion of the antimony trichloride and liquefiable hydrocarbons from said vapors; extractively distilling at least a portion of said condensed antimony trichloride and liquid hydrocarbons with normal pentane to produce liquid antimony trichloride substantially free of said liquid hydrocarbons; separating the antimony trichloride from the remaining uncondensed vapors with at least a portion of said oil to be treated to produce an inert carrier gas substantially free of antimony trichloride and a hydrocarbon oil containing antimony trichloride for contact with said slurry; recycling said inert carrier gas to said raffinate phase and said extract sludge phase; mixing said condensed antimony trichloride with fresh aluminum chloride for further contact with more hydrocarbon oil; clay-treating said raffinate oil; and steaming said aluminum chloride sludge containing extract oil to produce an extract oil layer and an aqueous aluminum chloride layer and separating said layers.

16. A continuous finishing process for treating solvent extracted mineral lubricating hydrocarbon oil comprising the steps of: contacting said oil with between about 10% and 215% by weight on the oil of a slurry of aluminum chloride dispersed in liquid antimony trichloride at a temperature between about 70° C. and 150° C. to produce a raffinate phase and an extract sludge phase, each of which contains antimony trichloride; separating said phases; separately vaporizing the antimony trichloride from the raffinate phase at a temperature between about 110° C. and 150° C. and from the extract sludge phase at a temperature not over about 125° C., each at a pressure between about 20 and 100 mm. of mercury, with natural gas to produce a raffinate oil, an aluminum chloride sludge containing extract oil, and vapors containing antimony trichloride, liquefiable hydrocarbons produced from cracking of oil treated in previous steps, and said natural gas; condensing at least a portion of the antimony trichloride and liquefiable hydrocarbons from said natural gas; purifying at least a portion of said condensed antimony trichloride and liquid hydrocarbons with normal pentane to produce liquid antimony trichloride substantially free of liquid hydrocarbons; extracting the antimony trichloride from the remaining uncondensed vapors with at least a portion of said oil to be treated at a reduced pressure of between about 20 and 100 mm. of mercury to produce an inert carrier gas substantially free of antimony trichloride for recontact with said raffinate phase and said extract sludge phase, and a hydrocarbon oil containing antimony trichloride for contact with said slurry; and recycling said purified liquid antimony trichloride for further contact with more hydrocarbon oil.

ROBERT G. LARSEN.
FORREST J. WATSON.